(12) United States Patent
Berard

(10) Patent No.: US 11,821,322 B2
(45) Date of Patent: Nov. 21, 2023

(54) ADDITIVE MANUFACTURED SEAL ROTOR; AND METHOD

(71) Applicant: Eaton Intelligent Power Limited, Dublin (IE)

(72) Inventor: Gerald Maurice Berard, North Providence, RI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/525,522

(22) Filed: Nov. 12, 2021

(65) Prior Publication Data

US 2022/0154590 A1    May 19, 2022

Related U.S. Application Data

(60) Provisional application No. 63/113,497, filed on Nov. 13, 2020.

(51) Int. Cl.
*F01D 11/00* (2006.01)
*B22F 10/25* (2021.01)
(Continued)

(52) U.S. Cl.
CPC ........ *F01D 11/006* (2013.01); *F05D 2230/50* (2013.01)

(58) Field of Classification Search
CPC ...... F01D 11/00; F01D 11/003; F01D 11/006; F01D 25/183; F01D 25/12; F01D 11/025;
(Continued)

(56) References Cited

U.S. PATENT DOCUMENTS 5,375,854 A * 12/1994 Carlisle ............... F16J 15/363
277/377
8,210,542 B1    7/2012 Gilstad
(Continued)

FOREIGN PATENT DOCUMENTS

EP    1 602 802 A1    12/2005
EP    3 385 507 A1    10/2018
(Continued)

OTHER PUBLICATIONS

Extended European Search Report for Application No. 21208024.6 dated Apr. 7, 2022.
(Continued)

*Primary Examiner* — Eric J Zamora Alvarez
(74) *Attorney, Agent, or Firm* — Merchant & Gould P.C.

(57) ABSTRACT

An additive manufactured rotor for a seal assembly is provided. The rotor surrounds a central axis and extends along the central axis from a first axial end to an opposite second axial end. The rotor is rotatable about an axis of rotation that is co-axial with the central axis. The rotor can include an outer ring and an inner ring that is connected to the outer ring by a radial web. The outer ring has a rotor face for providing a sealing surface at the first axial end. The outer ring can define a first annular cavity and the inner ring can define a second annular cavity that is radially separated from the first annular cavity. The radial web can define a
(Continued)

fluid channel for providing fluid communication between the first annular cavity of the outer ring and the second annular cavity of the inner ring.

17 Claims, 6 Drawing Sheets

(51) Int. Cl.
  *B22F 10/28*     (2021.01)
  *B22F 5/00*      (2006.01)
  *B33Y 80/00*     (2015.01)
  *F02C 7/28*      (2006.01)

(58) Field of Classification Search
  CPC .. F01D 11/18; F05D 2220/32; F05D 2230/31; F05D 2230/22; F05D 2230/50; F05D 2230/234; F05D 2240/55; F05D 2240/60; F05D 2260/20; F05D 2240/53; F05D 2260/38; F05D 2260/96; F04D 29/124; B22F 10/25; B22F 10/28; B22F 5/009; B33Y 10/00; B33Y 80/00; Y02T 50/60; F16J 3/047; F16J 15/52; F16J 15/3404; F16J 15/34; F02C 7/28
  See application file for complete search history.

(56) References Cited

U.S. PATENT DOCUMENTS

| | | | |
|---|---|---|---|
| 9,951,637 | B2 | 4/2018 | Berti et al. |
| 10,352,456 | B2* | 7/2019 | Amador ............ F16J 15/342 |
| 10,422,245 | B2 | 9/2019 | Cigal et al. |
| 10,626,743 | B2 | 4/2020 | Bidkar et al. |
| 2018/0045316 | A1* | 2/2018 | Kovacik ............ F01D 25/22 |
| 2019/0203842 | A1 | 7/2019 | Bidkar et al. |
| 2020/0131936 | A1* | 4/2020 | Amador ............ F01D 25/183 |
| 2020/0271013 | A1 | 8/2020 | Zelesky |

FOREIGN PATENT DOCUMENTS

| | | |
|---|---|---|
| EP | 3 647 634 A1 | 5/2020 |
| EP | 2 795 166 B1 | 1/2021 |
| WO | 2015036717 A1 | 3/2015 |

OTHER PUBLICATIONS

Great Britain Search Report for Application No. GB2116323.3 dated Mar. 31, 2022.

\* cited by examiner

US 11,821,322 B2

ADDITIVE MANUFACTURED SEAL ROTOR; AND METHOD

CROSS-REFERENCE TO RELATED APPLICATION

This application claims the benefit of U.S. Provisional Application Ser. No. 63/113,497, filed Nov. 13, 2020, the disclosure of which is hereby incorporated by reference in its entirety.

TECHNICAL FIELD

The present disclosure relates generally to rotors used in high temperature/high speed environments.

BACKGROUND

Mechanical face seals are widely used to provide sealing between a cavity within a stationary housing, often containing a fluid such as oil, and a rotating shaft that passes through the stationary housing to atmosphere. Dynamic sealing can be provided by a sealing ring that does not rotate relative to the stationary housing, and a mating ring which is affixed to a rotating shaft.

Rotors mounted on the rotating shaft are generally clamped down in order to resist high torque loads and to maintain closure of the shaft-mounted components. As a result of the clamping force, distortions may be transmitted to the rotor face since the mounting surfaces may not be uniform, rigid, or perfectly square to the shaft axis. These distortions are often referred to as "coning." However, for correct or proper operation, the rotor face should be maintained flat and square to the shaft within controlled tolerances. In addition to clamping induced distortion, inertial forces from a rotating shaft, pressure differences between the enclosed cavity and the atmosphere, and heating of the rotor from the sealing ring can additionally contribute to undesirable rotor face distortion.

SUMMARY

The present disclosure relates generally to an additive manufactured dynamic seal rotor with enhanced functionality for tuning rotor face coning and dynamic active cooling. The dynamic seal rotor can also have a significant mass reduction compared with conventional rotors.

As used herein, the term "additive manufacturing" encompasses any method or process whereby a three-dimensional object is produced by addition of successive layers of a material to produce a manufactured component. An additive manufacturing process differs significantly from conventional, erosive manufacturing methods. As used herein, the term "additive manufacturing" should not be construed to encompass fabrication or joining of previously formed objects. Instead of milling a work piece from a solid block, the components of an additive manufacturing are present as a starting material of fine powder and are built layer by layer. A variety of additive manufacturing technologies are commercially available, for example, 3D printing, which is often also understood to mean laser sintering or laser melting.

These technologies may use a variety of materials as substrates for an additive manufacturing process, including various plastics and polymers, metals and metal alloys, ceramic materials, metal clays, organic materials, and the like. The powdery material can include a metal powder, such as nickel, iron, cobalt, stainless steel, an alloy of these metals, or a ceramic powder. It will be appreciated that any method of additive manufacturing and associated compatible materials, whether presently available or yet to be developed, are intended to be included within the scope of the present disclosure.

One aspect of the present disclosure relates to an additive manufactured rotor for a sealing assembly. The rotor can surround a central axis and extend along the central axis from a first axial end to an opposite second axial end. The rotor can be rotatable about an axis of rotation, which is co-axial with the central axis. The rotor can include an outer ring that has a rotor face for providing a sealing surface at the first axial end. The outer ring can define a first annular cavity. The rotor can include an inner ring connected to the outer ring by a radial web. The inner ring can define a second annular cavity radially separated from the first annular cavity. The radial web can define a fluid channel for providing fluid communication between the first annular cavity of the outer ring and the second annular cavity of the inner ring. The first and second annular cavities can be concentric with the axis of rotation.

Another aspect of the present disclosure relates to a method for manufacturing a rotor. The method comprising a step of integrating internal features into the rotor using additive manufacturing.

These and other features and advantages will be apparent from a reading of the following detailed description and a review of the associated drawings. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Adjusting rotor face coning is paramount in the efficient operation of dynamic seals. Balancing thermal loads, external pressure, mechanical and inertial loads, and hydrodynamic pressure must all be tuned to accommodate rotor face flatness within operating tolerances for all modes of operation. There are very few features on conventional rotors that can be modified to achieve a desired face coning range without adding internal stress.

The present disclosure relates to an additive manufactured dynamic seal rotor and a method of fabricating the same. Additive manufacturing significantly enhances the ability to adjust or tune rotor face coning to a proper or acceptable flatness for specific or anticipated application. Such a method offers significant advantages over prior art solutions. The additive manufacturing techniques provide the ability to design a component that can easily be modified to meet operational requirements, without the manufacturing restrictions that are common with conventional manufacturing processes (i.e., welding, casting, etc.). The additive manufacturing technique can produce complex objects by constructing objects, typically in the vertical (Y) direction, point by point, layer by layer. Additive manufacturing techniques can be used to fabricate features on and within a dynamic seal rotor in accordance with the present disclosure to enhance its operational capabilities.

Although the addition of materials is preferred, those skilled in the art will appreciate that the methods and structures disclosed herein can be implemented by any additive manufacturing technique or technique. For example, layer additive processing, layer subtractive processing, or hybrid processing.

FIGS. 1-4 depict an example additive manufactured rotor 10 (e.g., mating ring) in accordance with the principles of the present disclosure. The rotor 10 is suitable for a gas turbine engine typically used in aircrafts, although alternatives are possible. It will be appreciated that aspects of the present disclosure are applicable to any rotational high temperature sealing application.

Figure 1:
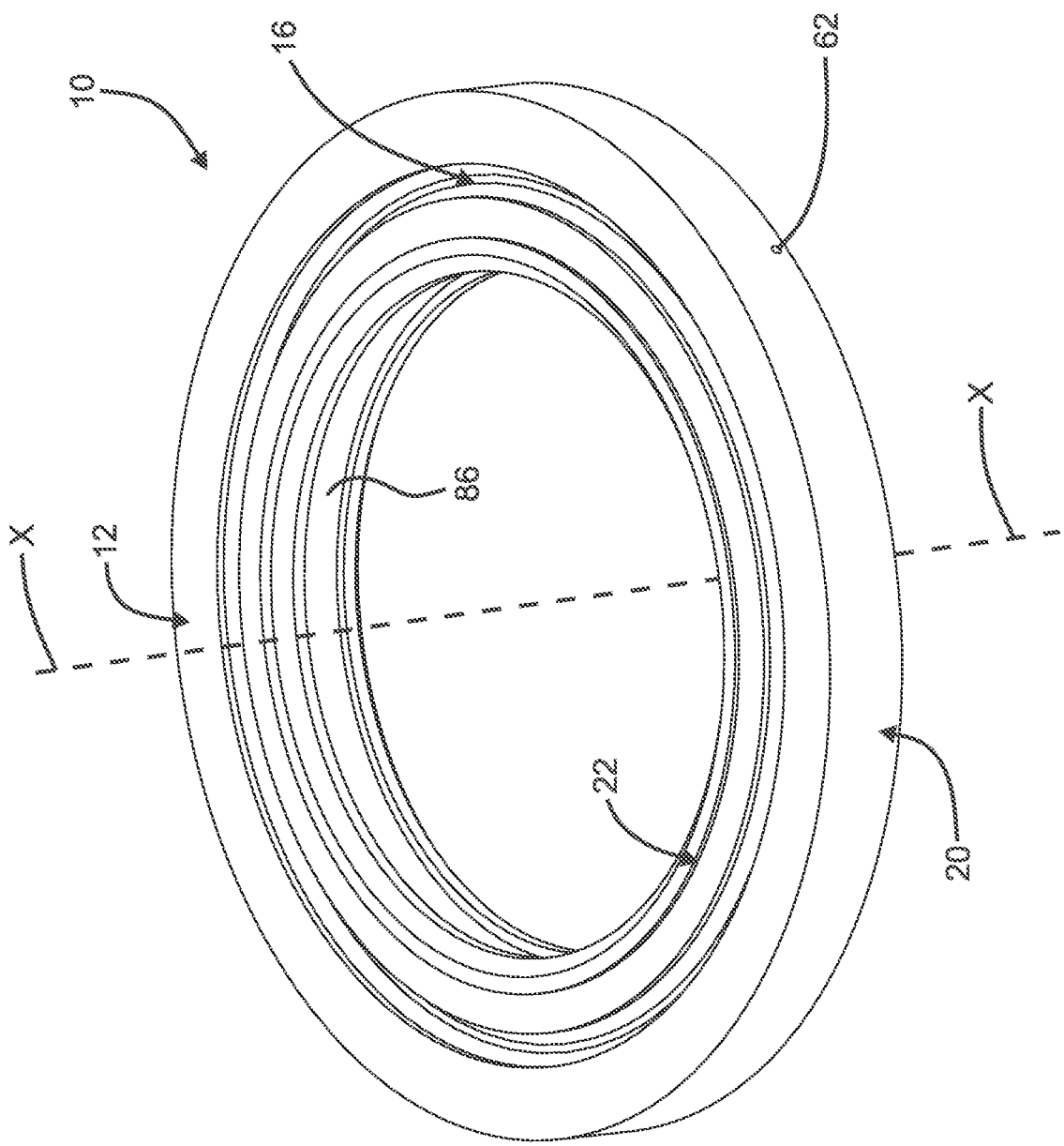
FIG. 1 illustrates a perspective view of a rotor in accordance with principles of the present disclosure.
Figure 2:
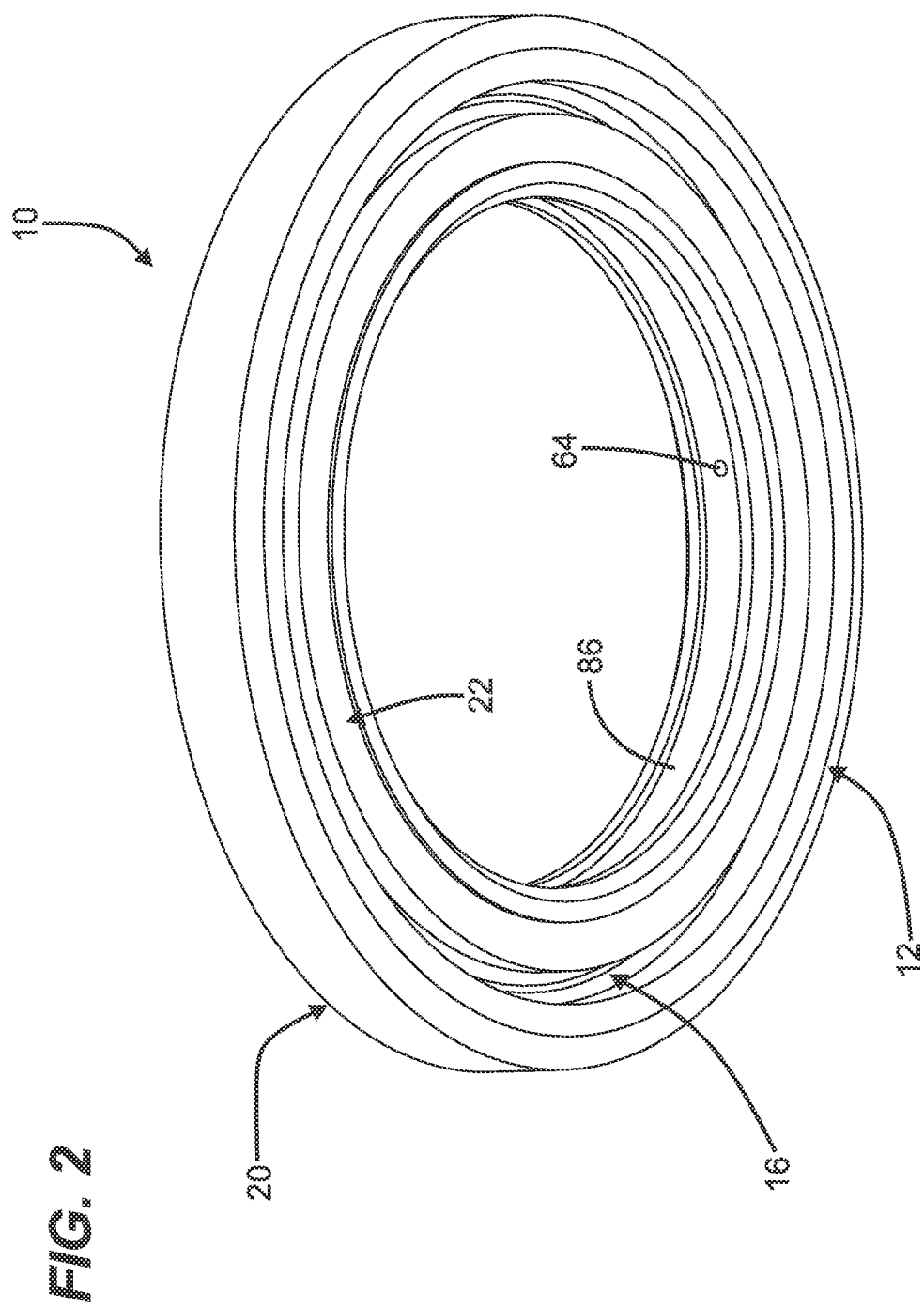
FIG. 2 illustrates a bottom perspective view of the rotor of FIG. 1.
Figure 3:
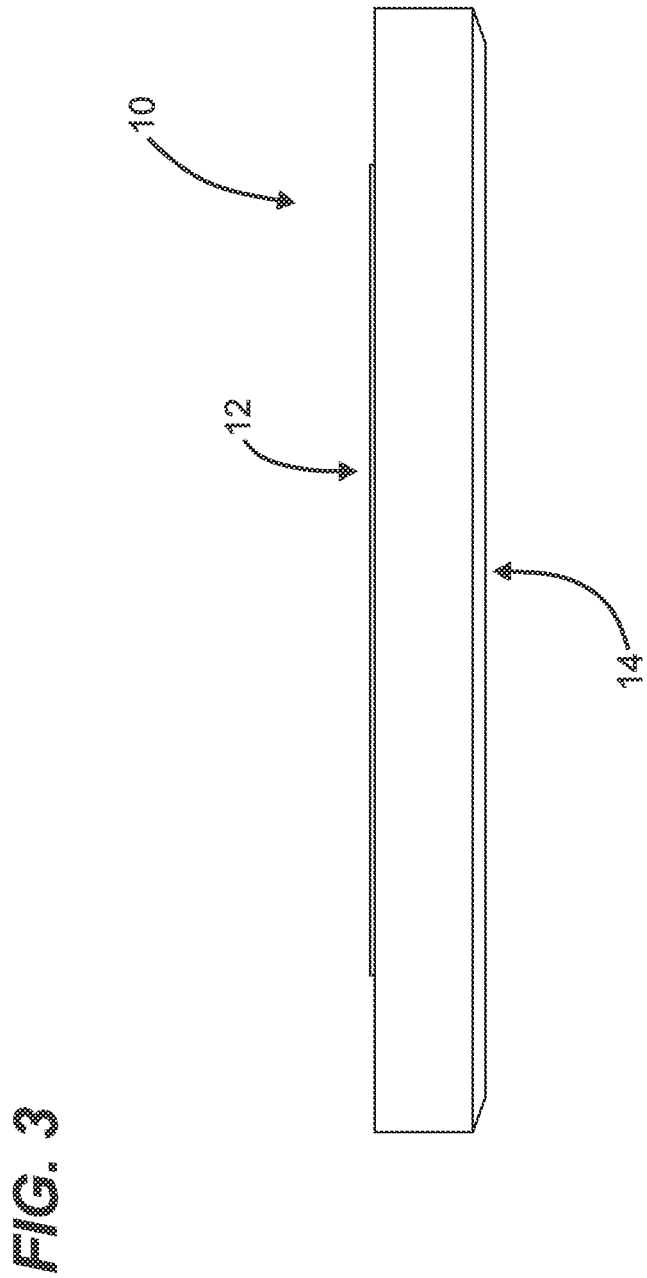
FIG. 3 illustrates a side view of the rotor of FIG. 1.
Figure 4:
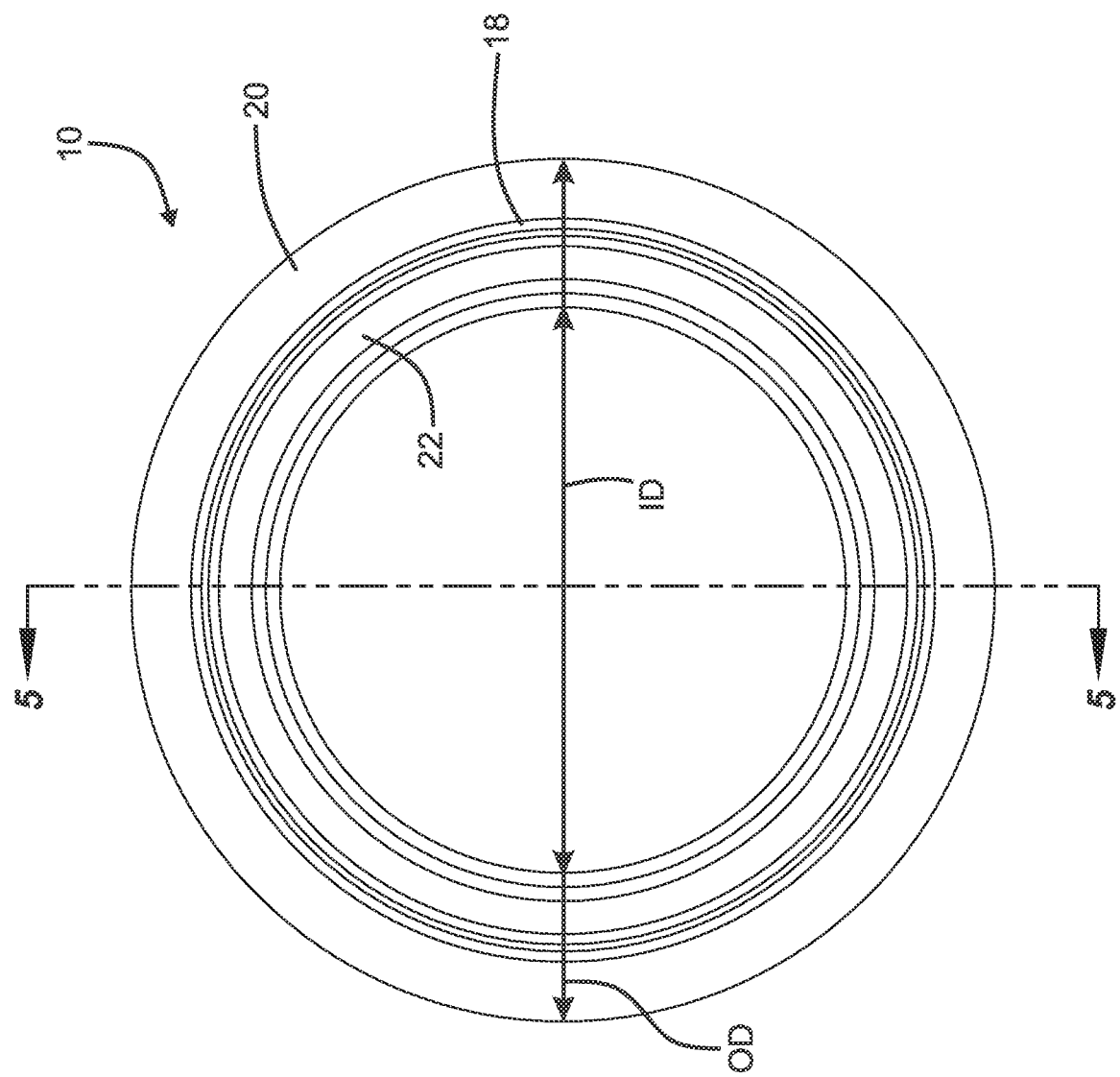
FIG. 4 illustrates a top view of the rotor of FIG. 1.
Figure 5:
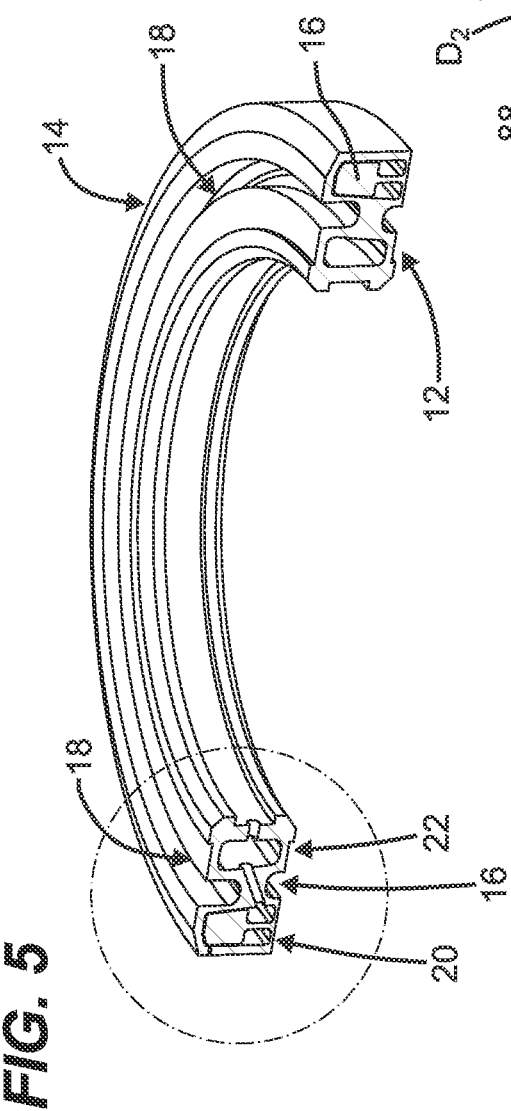
FIG. 5 illustrates a cross-sectional perspective view taken along line 5-5 of FIG. 4.
Figure 6:
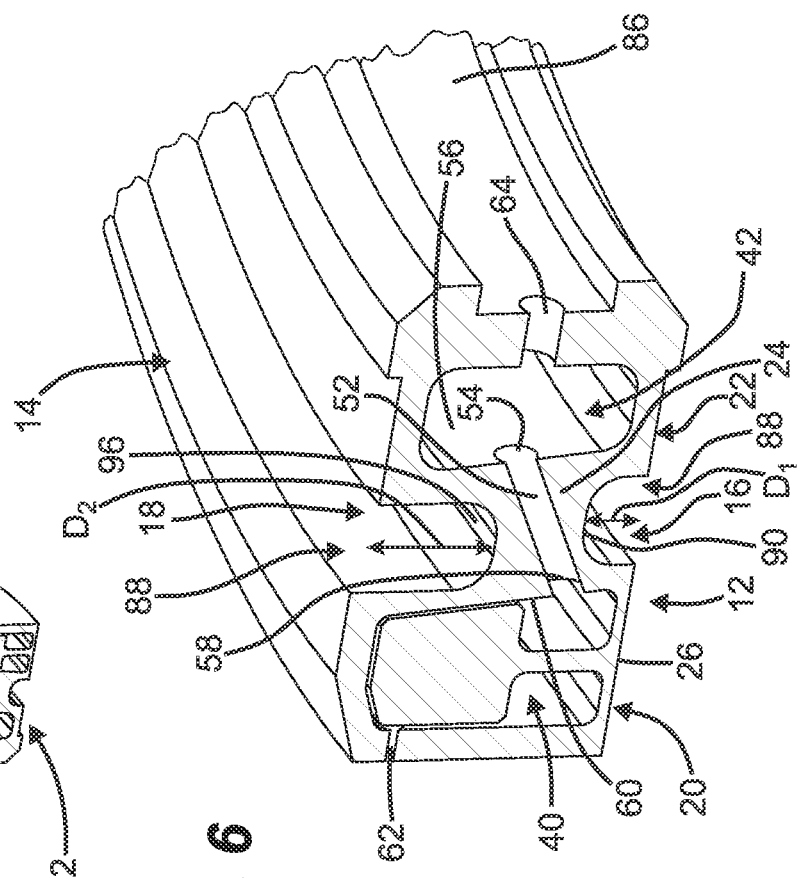
FIG. 6 illustrates an enlarged view of a portion of the rotor of FIG. 5.

The rotor 10 may be generally ring-shaped in structure and can be a unitary, monolithic body comprised of a single material or alloy with several integral structures. The rotor 10 surrounds a central axis X and extends along the central axis X from a first axial end 12 (e.g., front end) of the rotor 10 to an opposite second axial end 14 (e.g., rear end) of the rotor 10. A first circumferential groove 16 can be formed in the rotor 10 from the first axial end 12 via additive manufacturing and a second circumferential groove 18 can be formed in the rotor 10 from the second axial end 14 via additive manufacturing. The first and second circumferential grooves 16, 18 can provide the rotor 10 with increased flexibility to help reduce distortions. The first and second circumferential grooves 16, 18 are axially separated by a radial web 24 that extends circumferentially about the central axis X. When viewed in cross-section as shown at FIGS. 5 and 6, the first and second circumferential grooves 16, 18 can have depths $D_1$, $D_2$ that extend axially along the central axis X from open ends 88 of the first and second circumferential grooves 16, 18 at their respective first and second axial ends 12, 14 of the rotor 10 and closed ends 90 of the first and second circumferential grooves 16, 18 at the radial web 24. The depths $D_1$, $D_2$ can have different magnitudes. In one example, the depth $D_2$ is larger than the depth $D_1$.

FIGS. 5-6 illustrate a cross-sectional view of the rotor 10. The rotor 10 includes an outer ring 20 and an inner ring 22 connected to the outer ring 20 by the radial web 24. The first circumferential groove 16 can be formed into the front end 12 of the rotor 10 in front of the radial web 24, while the second circumferential groove 18 can be formed into the rear end 14 of the rotor 10 behind the radial web 24. Thus, the radial web 24 is positioned axially between the first and second circumferential grooves 16, 18 and the second circumferential groove 18 has a slightly larger average diameter than the first circumferential groove 16. When viewed in cross-section as shown at FIGS. 5 and 6, the radial web 24 has a height that extends radially relative to the central axis X between the outer and inner rings 20, 22. For example, the radial web 24 may have radial dimensions that correspond with a first height $H_1$ at the first circumferential groove 16 and a second height $H_2$ at the second circumferential groove 18. In certain examples, the first and second heights $H_1$, $H_2$ may be the same. As depicted, the first and second heights $H_1$, $H_2$ are different. The first and second circumferential grooves 16, 18 may be configured to provide a spring effect that in turn can reduce or eliminate coning and provide improved rotor sealing. Although two grooves are depicted, additional grooves may be formed in the rotor 10 to affect and/or reduce distortion.

The outer ring 20 may include a rotor face 26 at the first axial end 12 of the rotor 10. The rotor 10 is rotatable about an axis of rotation 28 that is coaxially aligned with the central axis X. The rotor face 26 is preferably square with respect to the axis of rotation 28, i.e., typically within zero to 100 micro inches but is dependent on operating conditions and requirements. During operation, viscous heating of the cooling fluid can be generated between a seal insert and the rotor face 26. In certain examples, frictional heating can be generated when a seal insert is in direct contact with the rotor face 26 during operation. As such, both viscous heating and frictional heating may cause thermal distortion of the rotor face 26. Pressure distortion may be caused by pressure loading from the seal ring rotor interface by mechanical or hydrodynamic pressure. In certain examples, pressure distortion may be caused by pressure loading from the pressure difference between the internal sealed fluid pressure and the external atmosphere. Temperature distortion may be caused by conduction through the shaft or convection from the internal fluid.

Figure 7:
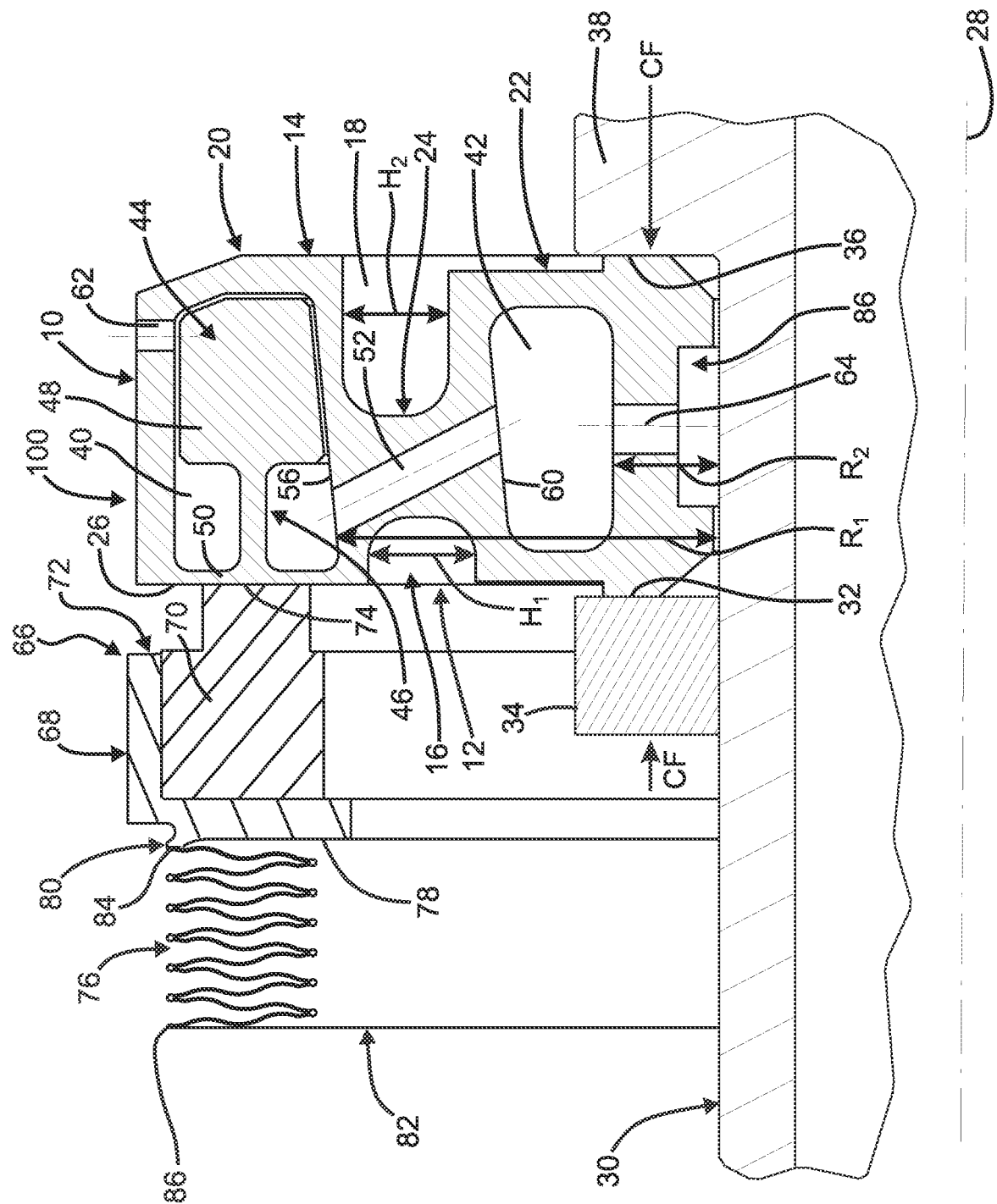
FIG. 7 illustrates a cross-sectional view of the rotor of FIG. 1 shown in a sealing assembly.

FIG. 7 generally shows a cross-sectional view of the rotor 10 in a sealing assembly 100, e.g., a seal ring assembly. The sealing assembly 100 includes the rotor 10 secured on the rotor shaft 30 such that the rotor 10 rotates in unison with the rotor shaft 30. The rotor 10 can be configured to engage a rotor shaft 30 such that a first clamping surface 32 of the inner ring 22 located at the first axial end 12 of the rotor 10 is engaged by a shaft nut 34 and a second clamping surface 36 of the inner ring 22 located at the second axial end 14 of the rotor 10 is engaged by a shaft shoulder 38. The sealing assembly 100 provides sealing with respect to the rotor shaft 30. In certain examples, the rotor shaft can include an engine shaft such as a drive shaft of a gas turbine engine. Of course, the aspects of the present disclosure are applicable to any rotational sealing applications. In certain examples, aspects of the present disclosure are applicable to high temperature/high speed sealing applications such as turbine engines for aircraft.

The sealing assembly 100 also includes a composite seal ring 66 that includes a seal ring shell 68 and a seal insert 70. The seal ring shell 68 can surround the central axis X and extend along the central axis X from a first end 72 to an opposite second end 80. The seal ring shell 68 can be comprised of a metallic material such as, but not limited to, copper, titanium, stainless steel, or high nickel alloy, although alternatives are possible. In certain examples, the seal insert 70 may be comprised of composite materials that include carbon, such as graphite. In other examples, the seal insert 70 can have a composition that includes ceramic materials. Of course, other material can be used as well for the seal insert.

The seal insert 70 is shown mounted at the first end 72 of the seal ring shell 68. In one example, the seal insert 70 is press fit within the first end 72 of the seal ring shell 68. The seal insert 70 has a sealing face 74 that faces axially outwardly from the seal ring shell 68. The sealing face 74 of the seal insert 70 is adapted to form a dynamic seal with respect to an opposing annular sealing surface (e.g., annular face 26 defined by the outer ring 20) of the rotor 10. That is, the seal insert 70 can provide a primary axial seal. The rotor shaft 30 extends through a center of the seal insert 70. The seal insert 70 is a non-rotating seal (e.g., the seal insert 70 does not rotate with the rotor shaft 30, but instead stays rotationally stationary).

The sealing assembly 100 can further include a welded bellows 76 that provides a static secondary sealing. In certain examples, the welded bellows may be constructed of a material having a composition that includes metallic materials such as stainless steel, nickel alloys, titanium allows, and/or any weldable alloys.

The welded bellows 76 may be designed to operate in non-oxidizing environments and temperatures in excess of 700° F. In certain examples, the welded bellows 76 can be axially compressed between an end wall 78 defined by the seal ring shell 68 at the second end 80 of the seal ring shell 68 and an end wall 82 defined by an outer housing (not shown). The welded bellows 76 can also axially expand between the end wall 78 of the seal ring shell 68 and the end wall 82 of the outer housing.

The welded bellows 76 can have a fixed end 84 that may be welded to the seal ring shell 68, while an opposite fixed end is welded or otherwise fixed to the end wall 82 of the outer housing, although alternatives are possible. In certain examples, one end of the welded bellows 76 can be fixed to one of the outer housing or the seal ring shell 68, while the opposite end is not welded or otherwise fixed to the other one of the seal ring shell 68 or the outer housing.

During operation, the seal insert 70 may contact the rotor face 26, which may result in viscous or friction heat generation during relative rotation therebetween. The heat generation may cause or establish a temperature gradient through the outer ring 20, which may result in some degree of thermal distortion of the rotor 10. In addition, a clamping force (CF) may be applied to the inner ring 22 that can be as high as 30,000 lbs. and for certain applications may even range as high as 90,000 lbs. or more. The clamping force (CF) may induce a measure of distortion on the rotor face 26, which may cause the rotor face 26 to go out of square with respect to the axis of rotation 28 and/or warping of the annular sealing surface of the rotor face 26.

The present disclosure provides an operational advantage by utilizing an additive manufacturing process that provides design features to better control external thermal and mechanical conditions known to cause distortion. The amount of undesirable distortion with respect to the rotor face 26 may be significantly reduced by adding internal features to the rotor 10 to more easily tune rotor face coning.

One aspect of the present disclosure is to reduce stress interference with the rotor face 26 to limit the amount of mechanical distortion. Optimizing the rotor 10 with a geometry or structure that eliminates 50-70% of its mass weight can help to control the thermal and mechanical distortions on the rotor face 26. For example, the rotor 10 can define a first annular cavity 40 (e.g., first annular chamber, outer cavity) within the outer ring 20 and a second annular cavity 42 (e.g., second annular chamber, inner cavity) within the inner ring 22 that reduces the overall weight of the rotor 10 from about 2.5 lbs to less than 1 lb, although alternatives are possible. The lighter weight of the rotor 10 not only enhances cooling efficiency, but also limits the amount of distortion that can interfere with the rotor face 26. The first and second annular cavities 40, 42 allow for more efficient cooling compared to tiny holes or grooves that may be utilized in conventional designs.

For example, by forming the rotor 10 with hollow cavities, mechanical stress can be carried on outside surfaces 32, 36 of the rotor 10 with very little stress carried inside of the rotor 10. By hollowing out portions of the rotor 10, stress and distortions caused by the clamping force (CF) can be transmitted or deflected to thinner portions of the rotor 10. The first and second annular cavities 40, 42 may be configured to weaken the structure of the rotor 10 because of the reduced mass, thereby making it is less stiff and more capable of absorbing some of the mechanical distortion caused by the clamping force (CF). The clamping force (CF) can cause bending in the rotor 10 near and/or in proximity to the rotor shaft 30 to help avoid transmitting distortion to the annular sealing surface of the rotor 10.

Another aspect of the present disclosure is to draw heat away from the rotor face 26 to limit the amount of thermal distortion. The reduced weight of the rotor 10 can also provide for enhanced efficient cooling. The first and second annular cavities 40, 42 may substantially reduce or prevent axial thermal deflection of the rotor face 26 compared to conventional designs. The rotor 10 has an inner diameter ID (see FIG. 4) and an outer diameter OD (see FIG. 4). Cooling oil can flow from the inner diameter ID of the rotor 10 into the second annular cavity 42 and into the first annular cavity 40 before exhausting outside the rotor 10 at the outer diameter OD of the rotor. As such, the cooling oil can flow closer to the rotor face 26 to help draw heat away more efficiently. The present disclosure has the advantageous feature of allowing cooling oil to flow axially through the rotor 10, closer to the rotor face 26 in order to draw heat away from the rotor face 26 and limit thermal distortion. In conventional rotor designs, cooling oil is typically injected on a back of a rotor such that heat transfers less efficiently across the rotor (i.e., from front to back).

The first and second annular cavities 40, 42 can be radially separated from one another. The radial web 24 can be configured to connect the first and second annular cavities 40, 42. The first and second annular cavities 40, 42 can be concentric with the axis of rotation 28. In certain examples, the second annular cavity 42 can be disposed radially closer to the rotor shaft 30 than the first annular cavity 40. In certain examples, the first annular cavity 40 and the second annular cavity 42 can be provided at different radial positions relative to each other and to the axis of rotation. For example, the first annular cavity 40 can have a first inner radius $R_1$ (see FIG. 7) with respect to the axis of rotation 28 and the second annular cavity 42 can have a second inner radius $R_2$ (see FIG. 7) with respect to the axis of rotation 28. The second inner radius $R_2$ of the second annular cavity 42 can be larger than the first inner radius $R_1$ of the first annular cavity 40. In certain examples, the first annular cavity 40 and the second annular cavity 42 can have a different size, a different shape, or both a different size and different shape.

Preferably, the rotor 10 includes an annular cooling fin 44 in the form of a heat sink to further "tune" rotor face coning. When viewed in cross-section as shown at FIG. 7, the cooling fin 44 can have a cantilevered configuration including a fixed end 46 adjacent to the rotor face 26 and an enlarged free end 48 (e.g., hammer head) within the first annular cavity 40. It will be appreciated that the size and shape of the cooling fin 44 may vary in other embodiments.

The cooling fin 44 can be positioned within the first annular cavity 40. For example, the fixed end 46 of the cooling fin 44 can be connected a front wall 50 of the first annular cavity 40 opposite the rotor face 26. The fixed end 46 of the cooling fin 44 can be integrally formed with the front wall 50 and extend therefrom. The fixed end 46 may also be integrally formed as one piece with the free end 48. As cooling oil flows around the cooling fin 44, more heat can be drawn away from the rotor face 26. That is, the cooling fin 44 acting as a heat sink can transfer heat away from the rotor face 26 efficiently and faster.

Because it can be a great expense to change a dynamic seal deep inside an engine, it is important that the dynamic seal is reliable to control cooling. Not only is the rotor 10 according to the present disclosure designed to improve cooling, but the rotor 10 is also designed such that external stresses can be adjusted to reduce mechanical distortion.

The cooling fin 44 of the rotor 10 can also function to manipulate the distribution of stress. The cooling fin 44 includes a center of gravity (CG) that can be manipulated to control distortion of the rotor face 26. For example, the internal shape of the free end 48 of the cooling fin 44 can be adjusted by moving the center of gravity (CG) to "tune" rotor face coning. Such a design cannot be manufactured conventionally but is achievable with the additive manufacturing process. Structural and thermal analysis of the rotor 10 can be defined to develop optimal configurations. The configuration of the cooling fin 44 can be shaped to achieve maximum coning of the rotor face 26 and need not be circumferentially continuous. The center of gravity (CG) of the cooling fin 44 may be manipulated or moved to "tune" the rotor face 26 which can reduce and/or distribute external stresses while maintaining the same cross-sectional profile and weight of the rotor 10.

The rotor 10 can be configured with internal features that can make the rotor 10 less impacted by operating conditions or thermal conditions during assembly and/or operation. For example, the sealing surface of the rotor face 26 is substantially insensitive from an operational/functional perspective to associated clamping load and/or environmental factors. As such, the design of the rotor 10 makes outside conditions less detrimental to the operation of the rotor 10.

Turning again to FIGS. 5-6, the radial web 24 of the rotor 10 may define a fluid channel 52 that extends through the height of the redial web 24 in a generally radial direction. The fluid channel 52 has a first end 54 defined in a first inner wall 56 of the first annular cavity 40 and a second end 58 defined in a first inner wall 60 of the second annular cavity 42. The fluid channel 52 is arranged and configured to allow cooling oil to flow between the first and second annular cavities 40, 42. For example, as the rotor 10 rotates, circumferential force can help push cooling oil through the second annular cavity 42 radially outwardly into the first annular cavity 40 and out of the rotor 10. In one example, the fluid channel 52 is skewed relative to the radial web 24 and angles toward the sealing surface of the rotor face 26 as the fluid channel 52 extends along the height of the radial web 24 in an outward radial direction from the second annular cavity 42 toward the first annular cavity 40. The angling provides space for allowing the second circumferential groove 18 at the rear end 14 of the rotor 10 to be deeper than the first circumferential groove 16 at the front end 12 of the rotor 10 and can allow the fluid to be directed closer to the rotor face 26.

The rotor 10 may also define a first vent opening 62 that extends from the first annular cavity 40 toward the outer surface (e.g., outer diameter) of the rotor 10 and a second vent opening 64 that extends from the second annular cavity 42 toward the inner surface (e.g., inner diameter) of the rotor 10. The second vent opening 64 can be associated with a channel 86 that is formed in the inner ring 22 at the inner diameter ID of the rotor 10. The channel 86 providing a spring effect that in turn can reduce or eliminate coning and provide improved rotor sealing. The first and second vent openings 62, 64 can be configured to extract unprocessed additive manufactured material. The first and second vent openings 62, 64 may also be configured for allowing fluid to flow therethrough to enable dynamic active cooling of the rotor 10.

Neither the first and second vent openings 62, 64 or the fluid channel 52 need to exist in the same cross-sectional plane and may independently vary in number as the design for specific applications requires.

EXAMPLE ASPECTS OF THE DISCLOSURE

Aspect 1. An additive manufactured rotor for a seal assembly, the rotor surrounding a central axis and extending along the central axis from a first axial end to an opposite second axial end, the rotor being rotatable about an axis of rotation, the axis of rotation being co-axial with the central axis, the rotor comprising:
  an outer ring having a rotor face for providing a sealing surface at the first axial end, the outer ring defining a first annular cavity; and
  an inner ring being connected to the outer ring by a radial web, the inner ring defining a second annular cavity radially separated from the first annular cavity, the radial web defining a fluid channel for providing fluid communication between the first annular cavity of the outer ring and the second annular cavity of the inner ring;
  wherein the first and second annular cavities are concentric with the axis of rotation.

Aspect 2. The rotor of aspect 1, further comprising an annular cooling fin formed in the outer ring to act as a heat sink.

Aspect 3. The rotor of aspect 1, further comprising a first circumferential groove formed in the radial web of the rotor from the first axial end.

Aspect 4. The rotor of aspect 3, further comprising a second circumferential groove formed in the radial web of the rotor from the second axial end.

Aspect 5. The rotor of aspect 4, wherein the first and second circumferential grooves are at least partially radially offset.

Aspect 6. The rotor of aspect 1, wherein the outer ring defines a first vent opening that extends from the first annular cavity toward an outer surface of the rotor.

Aspect 7. The rotor of aspect 6, wherein the inner ring defines a second vent opening that extends from the second annular cavity toward an inner surface of the rotor.

Aspect 8. The rotor of aspect 7, wherein the first and second vent openings are configured to extract unprocessed additive manufactured material.

Aspect 9. The rotor of aspect 7, wherein the first and second vent openings are configured to allow fluid to flow therethrough to enable dynamic active cooling of the rotor.

Aspect 10. The rotor of aspect 1, wherein the second annular cavity is disposed radially closer to a rotor shaft than the first annular cavity.

Aspect 11. The rotor of aspect 1, wherein the first annular cavity and the second annular cavity are provided at different radial positions relative to each other and to the axis of rotation.

Aspect 12. The rotor of aspect 1, wherein the first annular cavity and the second annular cavity have a different size, a different shape, or both a different size and a different shape.

Aspect 13. A sealing assembly comprising:
 a rotor surrounding a central axis and extending along the central axis from a first end to an opposite second end, the rotor being rotatable about an axis of rotation, the axis of rotation being co-axial with the central axis, the rotor being carried with a rotating shaft so as to rotate with the rotating shaft, the rotor including an outer ring and an inner ring connected to the outer ring by a radial web, the radial web providing fluid communication between the outer ring and the inner ring; and
 a composite seal ring including a seal ring shell and a seal insert, the seal ring shell surrounding the central axis and extending along the central axis from a first axial end to an opposite second axial end, the seal insert being mounted at the first axial end of the seal ring shell, the seal insert having a sealing face that faces axially outwardly from the seal ring shell;
 wherein the outer ring has a rotor face for providing a sealing surface at the first axial end, the sealing face being adapted to form a dynamic seal with the sealing surface of the rotor face; and
 wherein the outer ring defines a first annular cavity and the inner ring defines a second annular cavity radially separated from the first annular cavity, and wherein the first and second annular cavities are concentric with the axis of rotation.

Aspect 14. The sealing assembly of aspect 13, further comprising a welded bellows axially compressed between the seal ring shell and an end wall of an outer housing.

Aspect 15. The sealing assembly of aspect 14, wherein the welded bellows has a first fixed end and an opposite second fixed end, and wherein the first fixed end is welded to one of the seal ring shell and the end wall of the outer housing, and the second fixed end is welded to the other one of the seal ring shell and the outer housing.

Aspect 16. The sealing assembly of aspect 13, wherein the seal ring shell is metal and the seal insert is press fit, captured and mechanically secured, or bonded within the first axial end of the seal ring shell.

Aspect 17. The sealing assembly of aspect 16, wherein the seal insert is comprised of a carbon graphite material.

Aspect 18. A method for manufacturing a rotor, the rotor surrounding a central axis and extending along the central axis from a first axial end to an opposite second axial end, the rotor being rotatable about an axis of rotation, the axis of rotation being co-axial with the central axis, the method comprising:
 integrating internal features into the rotor using additive manufacturing.

Aspect 19. The method of aspect 18, wherein the internal features include an outer ring defining a first annular cavity and an inner ring defining a second annular cavity radially separated from the first annular cavity, and wherein the first and second annular cavities are concentric with the axis of rotation.

Aspect 20. The method of aspect 19, wherein the inner ring and the outer ring are connected by a radial web, the radial web defining a fluid channel that extends across the radial web and has a first end defined in a first inner wall of the first annular cavity and a second end defined in a first inner wall of the second annular cavity, the fluid channel being configured to provide fluid communication between the first and second annular cavities.

Aspect 21. The method of aspect 19, further comprising an annular cooling fin formed in the outer ring to act as a heat sink.

Aspect 22. The method of aspect 21, wherein the annular cooling fin has a cantilevered configuration including a fixed end and a free end, the fixed end being connected to a front wall of the outer ring.

Aspect 23. The method of aspect 19, wherein the second annular cavity is disposed radially closer to a rotor shaft than the first annular cavity.

Aspect 24. The method of aspect 19, wherein the first annular cavity and the second annular cavity are provided at different radial positions relative to each other and relative to the axis of rotation.

Aspect 25. The method of aspect 19, wherein the first annular cavity and the second annular cavity have a different size, a different shape, or both a different size and a different shape.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. An additive manufactured rotor for a seal assembly, the rotor surrounding a central axis and extending along the central axis from a first axial end to an opposite second axial end, the rotor being rotatable about an axis of rotation, the axis of rotation being co-axial with the central axis, the rotor comprising:
 an outer ring having a rotor face for providing a sealing surface at the first axial end, the outer ring defining a first annular cavity;
 an annular cooling fin formed in the outer ring to act as a heat sink; and
 an inner ring being connected to the outer ring by a radial web, the inner ring defining a second annular cavity radially separated from the first annular cavity, the radial web defining a fluid channel for providing fluid communication between the first annular cavity of the outer ring and the second annular cavity of the inner ring;
 wherein the first and second annular cavities are concentric with the axis of rotation.

2. The rotor of claim 1, further comprising a first circumferential groove formed in the radial web of the rotor from the first axial end.

3. The rotor of claim 2, further comprising a second circumferential groove formed in the radial web of the rotor from the second axial end, wherein the first and second circumferential grooves are at least partially radially offset.

4. The rotor of claim 1, wherein the outer ring defines a first vent opening that extends from the first annular cavity toward an outer surface of the rotor.

5. The rotor of claim 4, wherein the inner ring defines a second vent opening that extends from the second annular cavity toward an inner surface of the rotor.

6. The rotor of claim 5, wherein the first and second vent openings are configured to extract unprocessed additive manufactured material.

7. The rotor of claim 5, wherein the first and second vent openings are configured to allow fluid to flow therethrough to enable dynamic active cooling of the rotor.

8. The rotor of claim 1, wherein the second annular cavity is disposed radially closer to a rotor shaft than the first annular cavity.

9. The rotor of claim 1, wherein the first annular cavity and the second annular cavity are provided at different radial positions relative to each other and relative to the axis of rotation.

10. A sealing assembly comprising:
a rotor surrounding a central axis and extending along the central axis from a first end to an opposite second end, the rotor being rotatable about an axis of rotation, the axis of rotation being co-axial with the central axis, the rotor being carried with a rotating shaft so as to rotate with the rotating shaft, the rotor including an outer ring and an inner ring connected to the outer ring by a radial web, the radial web providing fluid communication between the outer ring and the inner ring;
an annular cooling fin formed in the outer ring to act as a heat sink; and
a composite seal ring including a seal ring shell and a seal insert, the seal ring shell surrounding the central axis and extending along the central axis from a first axial end to an opposite second axial end, the seal insert being mounted at the first axial end of the seal ring shell, the seal insert having a sealing face that faces axially outwardly from the seal ring shell;
wherein the outer ring has a rotor face for providing a sealing surface at the first end, the sealing face being adapted to form a dynamic seal with the sealing surface of the rotor face; and
wherein the outer ring defines a first annular cavity and the inner ring defines a second annular cavity radially separated from the first annular cavity, and wherein the first and second annular cavities are concentric with the axis of rotation.

11. The sealing assembly of claim 10, further comprising a welded bellows axially compressed between the seal ring shell and an outer housing end wall.

12. The sealing assembly of claim 11, wherein the welded bellows has a first fixed end and an opposite second fixed end, and wherein the first fixed end is welded to one of the seal ring shell and the outer housing end wall, and the second fixed end is welded to the other one of the seal ring shell and the outer housing end wall.

13. The sealing assembly of claim 10, wherein the seal ring shell is metal and the seal insert is press fit, captured, mechanically secured, or bonded within the first axial end of the seal ring shell.

14. An additive manufactured rotor for a seal assembly, the rotor surrounding a central axis and extending along the central axis from a first axial end to an opposite second axial end, the rotor being rotatable about an axis of rotation, the axis of rotation being co-axial with the central axis, the rotor comprising:
an outer ring having a rotor face for providing a sealing surface at the first axial end, the outer ring defining a first annular cavity; and
an inner ring being connected to the outer ring by a radial web, the inner ring defining a second annular cavity radially separated from the first annular cavity, the radial web defining a fluid channel for providing fluid communication between the first annular cavity of the outer ring and the second annular cavity of the inner ring;
wherein the first and second annular cavities are concentric with the axis of rotation, the outer ring defines a first vent opening that extends from the first annular cavity toward an outer surface of the rotor, the inner ring defines a second vent opening that extends from the second annular cavity toward an inner surface of the rotor.

15. The rotor of claim 14, wherein the first and second vent openings are configured to extract unprocessed additive manufactured material.

16. The rotor of claim 14, wherein the first and second vent openings are configured to allow fluid to flow therethrough to enable dynamic active cooling of the rotor.

17. An additive manufactured rotor for a seal assembly, the additive manufactured rotor comprising:
a rotor body surrounding a central axis and extending along the central axis from a first axial end to an opposite second axial end, the rotor body being rotatable about an axis of rotation, the axis of rotation being co-axial with the central axis;
the rotor body including a rotor face for providing a sealing surface at the first axial end, the sealing surface being defined by a front wall of the rotor body, the rotor body defining an internal annular cavity separated from the sealing surface by the front wall;
a fluid passage for directing cooling fluid through the rotor body, the fluid passage including the internal annular cavity; and
an annular cooling fin formed in the internal annular cavity, the annular cooling fin being coupled to the front wall such that heat from the sealing surface is adapted to be transferred from the front wall to the annular cooling fin, wherein the annular cooling fin is configured such that the cooling fluid directed through the fluid passage is adapted to contact and provide cooling of the annular cooling fin; and
wherein the annular cooling fin has a cross-sectional profile having a cantilevered configuration including a base end and an opposite free end, wherein the base end connects to the front wall and the free end includes an enlarged head.

* * * * *